United States Patent [19]
Ma

[11] Patent Number: 5,795,029
[45] Date of Patent: Aug. 18, 1998

[54] MOUNTING BRACKET FOR A COLLAPSIBLE WINDSOR CHAIR

[76] Inventor: Mark Ma, 1415 Martens Dr., Hammond, La. 70401

[21] Appl. No.: 695,111

[22] Filed: Aug. 8, 1996

[51] Int. Cl.[6] .................................................. A47C 7/00
[52] U.S. Cl. .......................... 297/440.16; 297/440.15; 403/258; 403/260; 411/104
[58] Field of Search ................ 297/440.15, 440.16; 403/230, 256, 258, 260; 411/104, 155, 156, 544

[56] References Cited

U.S. PATENT DOCUMENTS

| | | | |
|---|---|---|---|
| 655,488 | 8/1900 | Hayes | 297/440.16 X |
| 1,392,242 | 9/1921 | Albergoli | 297/440.15 X |
| 1,671,757 | 5/1928 | Allen | 411/104 |
| 2,557,766 | 6/1951 | Ronfeldt | 403/258 X |
| 3,704,912 | 12/1972 | Bezark | 297/440.16 X |
| 3,727,981 | 4/1973 | Ostroff et al. | 297/440.15 |
| 3,835,610 | 9/1974 | Harper et al. | 411/104 X |
| 4,139,314 | 2/1979 | Albern | 403/260 X |
| 4,261,665 | 4/1981 | Hsiung | 403/260 X |

FOREIGN PATENT DOCUMENTS

| | | | |
|---|---|---|---|
| 124209 | 11/1901 | Germany | 403/260 |
| 16011 | 3/1927 | Netherlands | 403/258 |
| 468564 | 3/1969 | Switzerland | 403/258 |
| 452331 | 8/1936 | United Kingdom | 403/258 |
| 657257 | 9/1951 | United Kingdom | 403/189 |
| 1497532 | 1/1978 | United Kingdom | 403/260 |

OTHER PUBLICATIONS

IKEA, Design and Quality, IKEA of Sweden, Lambert.

Primary Examiner—Peter M. Cuomo
Assistant Examiner—Rodney B. White
Attorney, Agent, or Firm—Pravel, Hewitt, Kimball & Krieger

[57] ABSTRACT

A method of assembling a chair back onto a chair bottom by providing a back portion of material having first and second end portions insertable into the chair bottom, boring a hole longitudinally into the ends of the back members, providing a bore transverse to the longitudinal bore on each of the end portions of the chair back, inserting peg member into the transverse bore, the peg member further including a threaded bore which aligns with the longitudinal bore when the member is positioned therein, providing a bolt member insertable into the longitudinal bore from the underside of the chair bottom and threadably engaging the peg member inserted therein, and threadably tightening the bolt member so that as the bolt member is tightened the chair back end portions are fulled in engagement with the chair bottom.

2 Claims, 2 Drawing Sheets

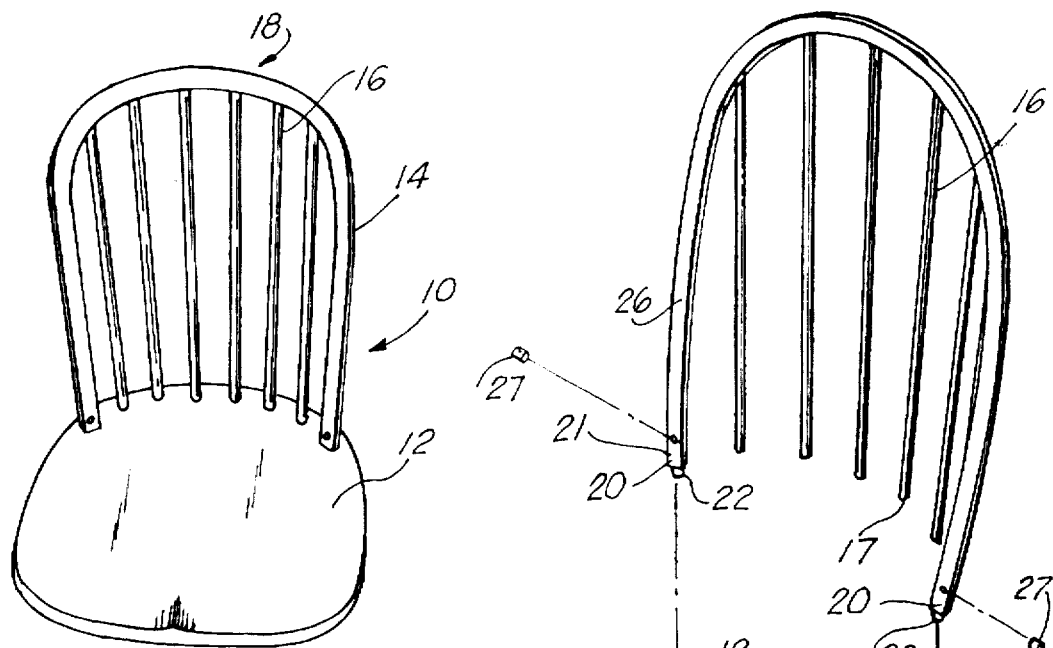
FIG. 1
FIG. 2
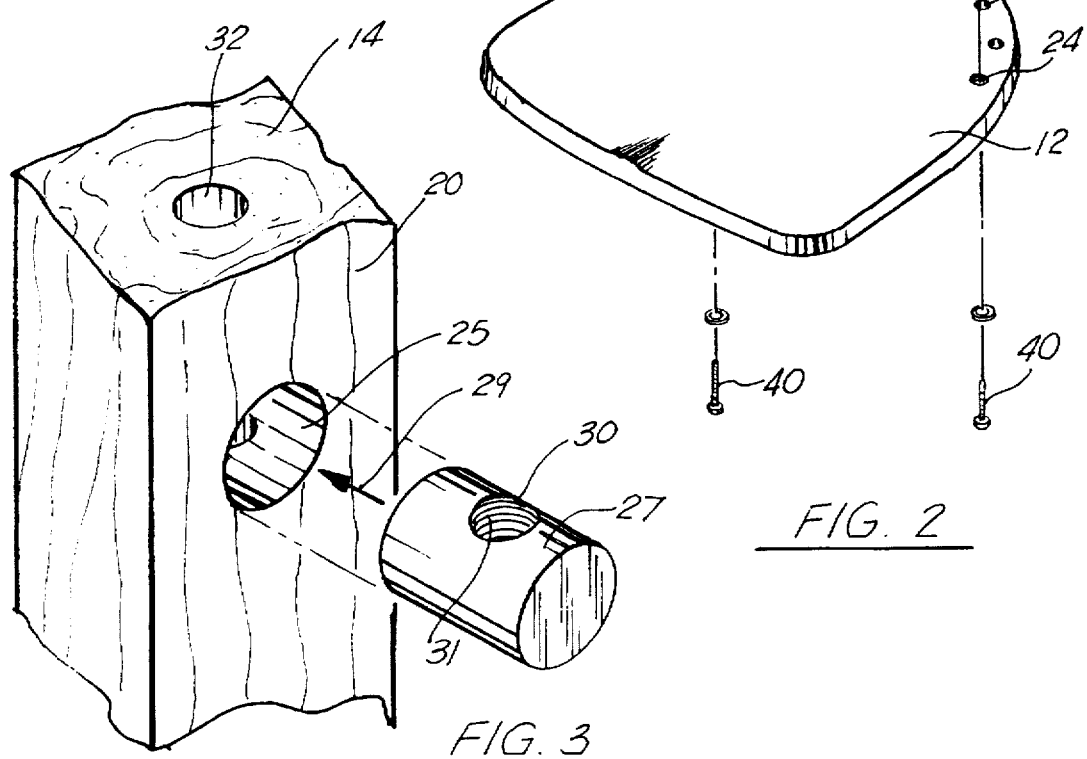
FIG. 3

MOUNTING BRACKET FOR A COLLAPSIBLE WINDSOR CHAIR

BACKGROUND OF THE INVENTION

1. Field of the Invention

The apparatus of the present invention relates to wooden chairs. More particularly, the apparatus of the present invention also relates to a mounting bracket apparatus that can be utilized to construct chairs having wooden backs, in a simplified manner, yet which makes the chair back sturdy when completed, so that the chair may be shipped disassembled for reduction of storage space.

2. General Background

In the furniture business, one of the most troublesome areas, is the fact that, due to the fact that most items of furniture occupies a great deal of space, storage of furniture is a problem. Therefore, it would be beneficial to have certain items of furniture that could be shipped disassembled in small packages, so that many items could be stored by the retailer, and yet when the furniture is sold, the items of furniture can be assembled quite easily by a lay person who has bought the item of furniture. This is very common in the area of shelving, where shelving units can be constructed quite easily to form a sturdy shelving unit, yet can be shipped as a very small package which occupies very little space.

One of the most troublesome items of furniture for packaging in small units are chairs. Due to the configuration of chairs, particularly wooden chairs which have four legs extending outward, downwardly from a seat portion, and a back portion extending upward therefrom, a chair occupies a great deal of space during shipping, yet most of that space is unoccupied, simply due to the geometric configuration of the chair. Therefore, it is beneficial to have a method of assembling a chair, which is quite easy for a lay person, yet provides that the chair be quite sturdy when the assembly is completed.

In that manner, the chair may be shipped in an unassembled configuration, which therefore lends itself to packaging which would occupy less space, and would therefore facilitate storage of the chair by the wholesaler and the retailer prior to sales thereof.

SUMMARY OF THE PRESENT INVENTION

The apparatus and method of the present invention provides a method of assembling a chair back onto a chair bottom by providing a back portion of material having first and second end portions insertable into the chair bottom, boring a hole longitudinally into the ends of the back members, providing a bore transverse to the longitudinal bore on each of the end portions of the chair back, inserting peg member into the transverse bore, the peg member further including a threaded bore which aligns with the longitudinal bore when the member is positioned therein, providing a bolt member insertable into the longitudinal bore from the underside of the chair bottom and threadably engaging the peg member inserted therein, and threadably tightening the bolt member so that as the bolt member is tightened the chair back end portions are pulled in engagement with the chair bottom.

Therefore, it is a principal object of the present invention to provide a method for erecting a wooden chair which allows the chair to be shipped disassembled and allows for easy, yet structurally sound assembly by a lay person.

It is a further object of the present invention to provide a method for erecting a wooden chair so that a purchaser may simply complete the assemblage of the chair after the chair has been prepared for assembly at the factory.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1 illustrates an overall view of a chair back assembled onto a chair set in the method of the present invention;

FIG. 2 illustrates an exploded view of FIG. 1 thereof;

FIG. 3 illustrates a partial cut-away view of the fixture for assembling the back onto the chair bottom;

DETAILED DESCRIPTION OF THE PREFERRED EMBODIMENT

Figure 4:
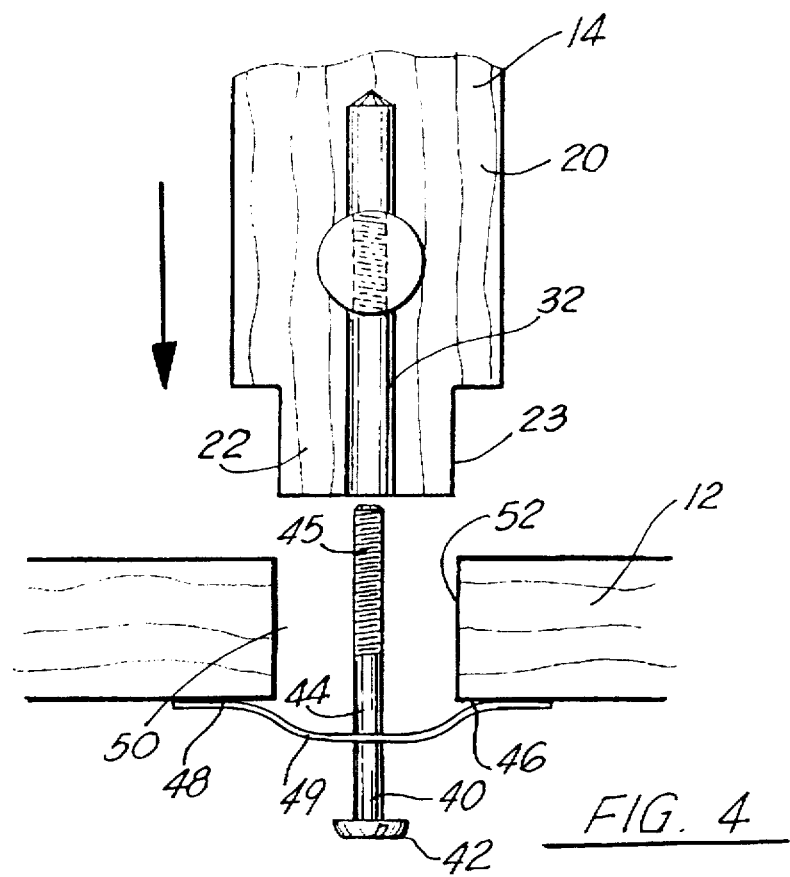
FIG. 4 illustrates a partial exploded view of the configuring element between the chair back and the bottom.

FIGS. 1 through 5 illustrate the preferred embodiment of the apparatus of the present invention and the method of assemblage.

As illustrated in FIG. 1, there is seen a chair member 10, which is commonly known as "windsor chair", having a substantially flat seat portion 12, a rounded overall back frame portion 14, having a plurality of upright back members 16, together with 14 comprise the back portion 18, as illustrated. For purposes of construction as illustrated in FIG. 2, the ends 20 of frame member 14 include a reduced diameter peg portion 22, which are insertable into a port 24, on seat 12, as illustrated in FIG. 2, which likewise the end portions of each of the upright members 16 have a reduced end portion 17 which are insertable into a plurality of ports 19 as illustrated across the back edge of seat portion 12. Likewise, although not illustrated seat portion 12 would include a plurality of legs which extend downward from the under portion of seat 12, in order to support the seat 12 above the floor, so that a person may sit thereupon. Normally such leg portions would be positioned into the seat 12, via doweling or the like, and can be glued therein.

This invention pertains more particularly to the manner in which the rounded back portion 18 is insertable into seat portion 12. As was discussed earlier, this particular invention addresses the manner in which a lay person can purchase the disassembled chair, and is able to assemble the chair quite easily, with the present invention, and therefore have a solidly assembled chair that can be assembled in one's home, and yet can be shipped in a configuration that does not require a great deal of space.

Figure 5:
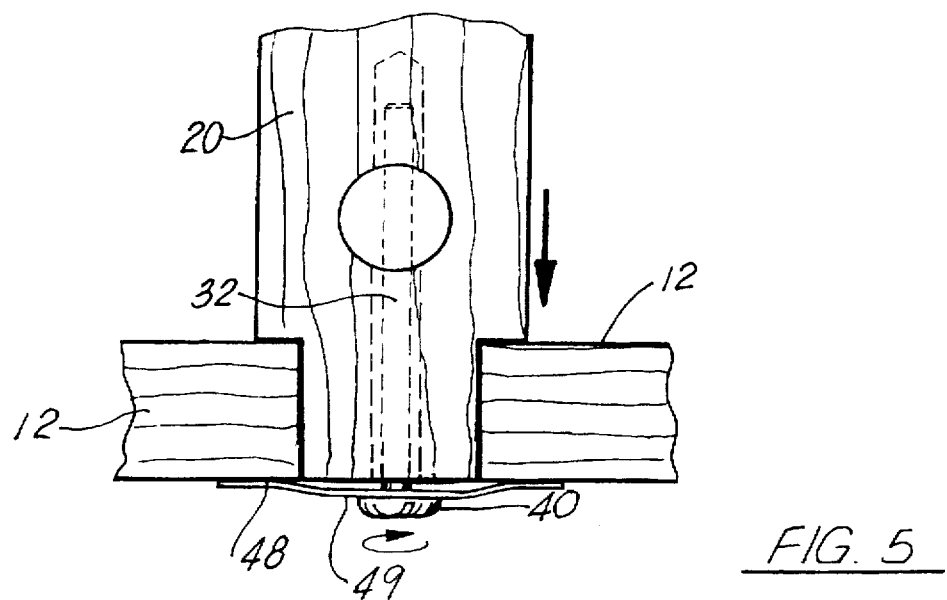
FIG. 5 illustrates a view of FIG. 4 after the back has been assembled onto the chair bottom.

Turning now to the method and apparatus of the present invention, reference is made to FIGS. 3 through 5, wherein there is illustrated in partial view in FIG. 3, the upper end portion 20 of rounded frame portion 14, with the end portion 20 including a laterally disposed bore 25 bored into the wall 26 of end portion 20, of the necessary diameter in order to include a threaded peg member 27, the function of which will be described further, as illustrated, peg member 27 would slide into the bore 25 in the direction of Arrow 29, and would be of a length substantially the length of the width of back frame portion 14. As illustrated, peg 27 would include an upright bore 30, having a threaded wall 31, so that when inserted into the leg portion, as illustrated in FIGS. 4 and 5, the threaded bore 30 would actually align with the longitudinal bore 32 down the center of end portion 20, as illustrated in FIG. 3. Bore 32 would extend from that point as illustrated in FIG. 3, through the bottom of the reduced end portion 22, as illustrated in FIG. 4.

Therefore, turning now to FIG. 4, there is illustrated a bolt 40 having a head portion 42 and a body portion 44, with the body portion 44 including a threaded end portion 45. As illustrated, bolt 40 is extending through a bore 46 through seat 12, and would include a broad flared washer member 48. Washer 48, as seen in FIGS. 4 and 5 would include a central body area 49, which would "bubble" outward from the chair bottom, as noted in FIGS. 4 and 5. This formation of the body portion of washer 48 would therefore allow that should the end portion 22 extend outward beyond the seat 2, that the end could extend slightly into the bubbled portion 49 of washer 48 and would be accommodated therewithin. The length of bolt 40 would extend into and through bore 32 in the end 20 of back frame portion 14. In doing so, the end portion 45, after peg 27 has been slidingly inserted into bore 25, the threaded bolt portion 45 would threadably engage the threaded wall portion 31 of peg 27. Therefore, when one would insert bolt 44 into position, as seen in FIG. 4, one would then threadably engage peg 27, and in doing so, as bolt 40 was threadably screwed in, it would therefore pull the end portion 22 of frame member 14 down into ports 24 in seat 12, and would engage it therein as seen in FIG. 5. Therefore, a tightening of bolt 40, as illustrated in FIG. 5, would therefore draw frame 14 in tightened engagement against the upper surface of seat 12, and in doing so, would maintain it in position therein. Of course, one may also provide a layer of glue along the inner wall 52 of ports 24 and glue along the wall 23 of reduced portion 22, in order to insure permanent and tight engagement therewith. Likewise, one would want to assure that each of the end portions 17 of each of the standard 16 would be placed in position in bores 19, so that when bolt members 40 were threadably engaged therewith, onto seat 12, all of the members would be drawn likewise into the respective bores and back 18 would be affixed to seat portion 12, as illustrated in FIG. 1.

This method of assuring the engagement of a back onto a chair bottom, is quickly accomplished, and assures that no unsightly bolts or the like are shown in the back portion once the construction and assemblage is completed.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

The following table lists the part numbers and part descriptions as used herein and in the drawings attached hereto.

PARTS LIST

| Description | Part No. |
| --- | --- |
| chair | 10 |
| seat portion | 12 |
| back frame portion | 14 |

-continued

PARTS LIST

| Description | Part No. |
| --- | --- |
| upright members | 16 |
| end portion | 17 |
| back portion | 18 |
| ports | 19 |
| ends | 20 |
| peg portion | 22 |
| port | 24 |
| bore | 25 |
| wall | 26 |
| peg member | 27 |
| arrow | 29 |
| threaded bore | 30 |
| threaded wall | 31 |
| longitudinal bore | 32 |
| bolt | 40 |
| head portion | 42 |
| body portion | 44 |
| end portion | 45 |
| wsher member | 48 |
| central body area | 49 |
| receiving bore | 50 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A chair of the type comprising a chair back positionable onto a chair bottom, with the chair back comprising at least a pair of back members insertable into bores in the chair bottom, the chair comprising:

a) first and second end portions of the back members insertable into the bores of the chair bottom, each of the back members including a first longitudinal bore in the end portions of the back members, a second bore transverse to the longitudinal bore in each of the end portions of the back members;

b) a peg member insertable into each transverse bore, the peg member further comprising a threaded bore which aligns with the longitudinal bore when the peg member is positioned within the transverse bore;

c) a bolt member insertable into each longitudinal bore through the bore of the chair bottom for engaging the peg member inserted therein; and d) support members positionable on an underside of the chair bottom under the bores of the chair bottom, each support member further including a central body portion that is bubbled outward from the chair bottom and including a bore for accommodating the bolt member therethrough, so that as the bolt member is threaded into the transverse bore of the peg member, the bolt member engages the central bubbled portion of the support member and the end portions of the back members are pulled into the bores of the chair bottom.

2. The chair in claim 1, wherein the support member comprises a washer positioned on the underside of the chair at the location of each of the bores in the chair bottom.

\* \* \* \* \*